(12) United States Patent
Croak et al.

(10) Patent No.: US 8,867,524 B1
(45) Date of Patent: Oct. 21, 2014

(54) METHOD AND APPARATUS FOR ACTIVATING AN INCOMING CALL VOICE SESSION ON A VIDEO DISPLAY DEVICE

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1567 days.

(21) Appl. No.: 11/239,758

(22) Filed: Sep. 30, 2005

(51) Int. Cl.
*H04L 12/66* (2006.01)

(52) U.S. Cl.
USPC ........... 370/352; 370/356; 370/355; 370/260; 370/401; 725/106; 725/122; 455/414.1

(58) Field of Classification Search
CPC ............. H04M 7/006; H04L 29/06176; H04L 29/06197; H04N 7/141
USPC .................. 370/352, 260, 401; 725/106, 122; 455/414.1
See application file for complete search history.

(56) References Cited

U.S. PATENT DOCUMENTS

| | | | | |
|---|---|---|---|---|
| 6,052,444 | A * | 4/2000 | Ferry et al. ................. | 379/93.35 |
| 6,831,969 | B2 * | 12/2004 | Ju ............................. | 379/142.16 |
| 7,336,653 | B2 * | 2/2008 | Adams et al. ................ | 370/352 |
| 7,532,628 | B2 * | 5/2009 | Lepore et al. ................ | 370/401 |
| 7,565,680 | B1 * | 7/2009 | Asmussen ..................... | 725/135 |
| 2001/0038690 | A1 * | 11/2001 | Palmer et al. ............ | 379/218.01 |
| 2001/0041053 | A1 * | 11/2001 | Abecassis ....................... | 386/83 |
| 2002/0085542 | A1 * | 7/2002 | Bedingfield et al. .......... | 370/352 |
| 2003/0041333 | A1 * | 2/2003 | Allen et al. .................... | 725/106 |
| 2003/0133558 | A1 * | 7/2003 | Kung et al. ............. | 379/215.01 |
| 2003/0190024 | A1 * | 10/2003 | Ju ............................ | 379/142.16 |
| 2003/0206720 | A1 * | 11/2003 | Abecassis ....................... | 386/83 |
| 2004/0203835 | A1 * | 10/2004 | Trottier et al. ................ | 455/454 |
| 2004/0248594 | A1 * | 12/2004 | Wren, III ....................... | 455/465 |
| 2005/0074105 | A1 * | 4/2005 | Corbett et al. ........... | 379/142.16 |
| 2005/0245240 | A1 * | 11/2005 | Balasuriya et al. ........ | 455/414.1 |
| 2006/0020993 | A1 * | 1/2006 | Hannum et al. ............... | 725/111 |
| 2006/0031897 | A1 * | 2/2006 | Pulitzer ........................ | 725/100 |
| 2006/0088149 | A1 * | 4/2006 | Sung ........................ | 379/142.16 |
| 2006/0098793 | A1 * | 5/2006 | Erhart et al. ............... | 379/88.16 |
| 2007/0060054 | A1 * | 3/2007 | Romesburg .................. | 455/41.2 |
| 2007/0186002 | A1 * | 8/2007 | Campbell et al. ............. | 709/231 |

OTHER PUBLICATIONS

Jenny Huang, OMG Joint MARS & Telecom Meeting, TMF SoIP (Services over IP) Project Overview, Nov. 1, 2004 Washington DC.*

* cited by examiner

*Primary Examiner* — Khaled Kassim

(57) ABSTRACT

A method and apparatus for enabling service providers to support video services by creating a display frame, such as a picture-in-picture display frame, on an active video display device, such as a television (TV), when an incoming call is received are disclosed. The calling party identification and the service logic to manipulate the call are displayed within the display frame. The network can provide service logic functions such as, but are not limited to, answering the call, sending to call to voice mailbox, providing a busy tone to the calling party, and forwarding the call to another SoIP endpoint.

10 Claims, 5 Drawing Sheets

METHOD AND APPARATUS FOR ACTIVATING AN INCOMING CALL VOICE SESSION ON A VIDEO DISPLAY DEVICE

The present invention relates generally to communication networks and, more particularly, to a method and apparatus for activating an incoming call voice session on a video display device in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data providing more convenience for end customers and creating new service opportunities. Due to the multi-service nature of these new services, networks need to provide additional functionalities to end customers to support integrated control of these different types of services. For instance, if a video session is active while an incoming call is received, then the network must provide the subscriber with the appropriate service logic to handle the incoming call while the video session is on-going.

Therefore, a need exists for a method and apparatus for activating an incoming call voice session on a video display device in a packet network, e.g., a SoIP network.

SUMMARY OF THE INVENTION

In one embodiment, the present invention enables a SoIP network supporting video services by creating a display frame, such as a picture-in-picture display frame, on an active video display device, such as a television (TV), when an incoming call is received. The calling party identification and the service logic to manipulate the call are displayed within the display frame. The network can provide service logic functions such as, but are not limited to, answering the call, sending to call to voice mailbox, providing a busy tone to the calling party, and forwarding the call to another SoIP endpoint. The on-going video session can be placed on hold, moved to the background within the display, or continued as is while the incoming call is active.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
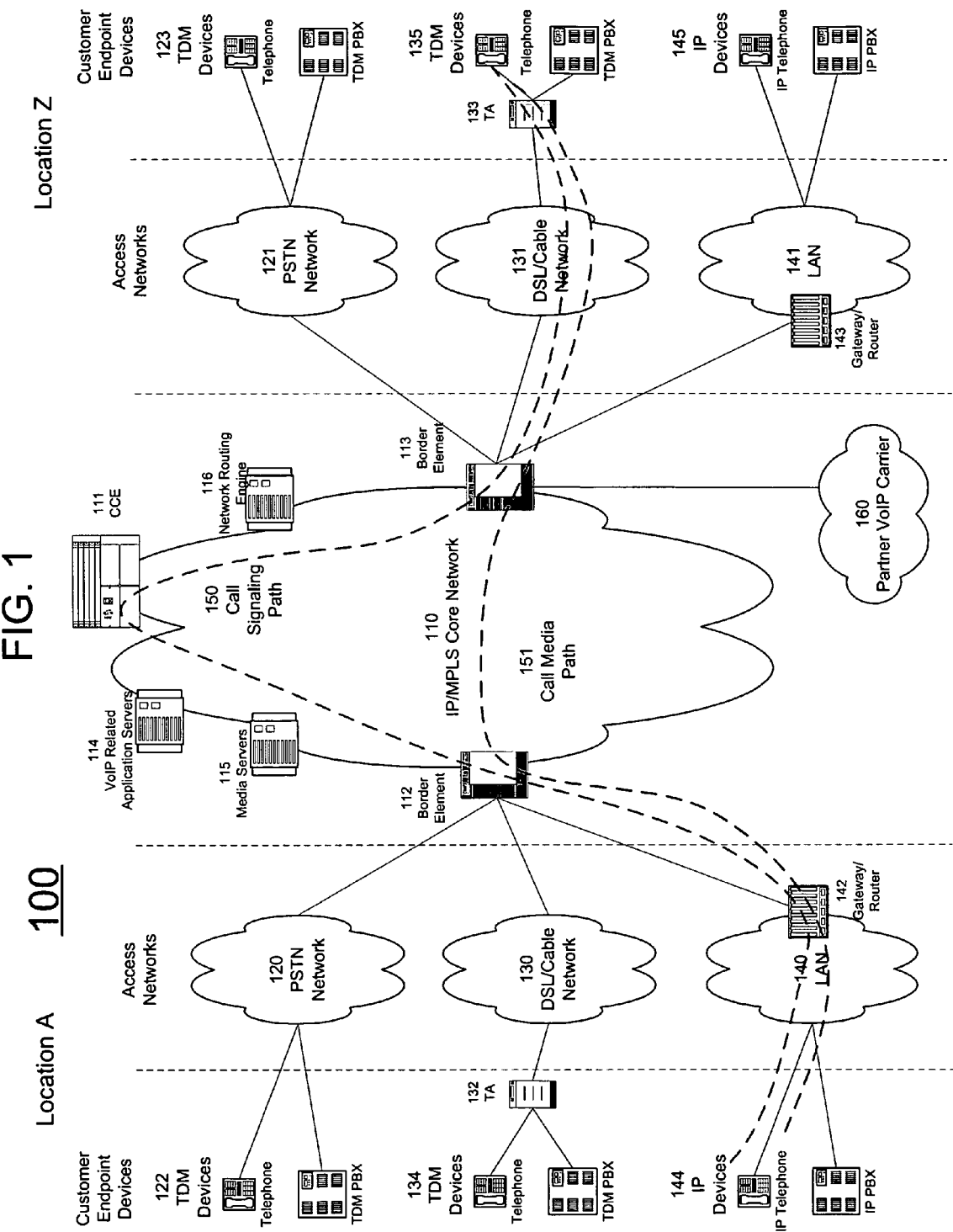
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
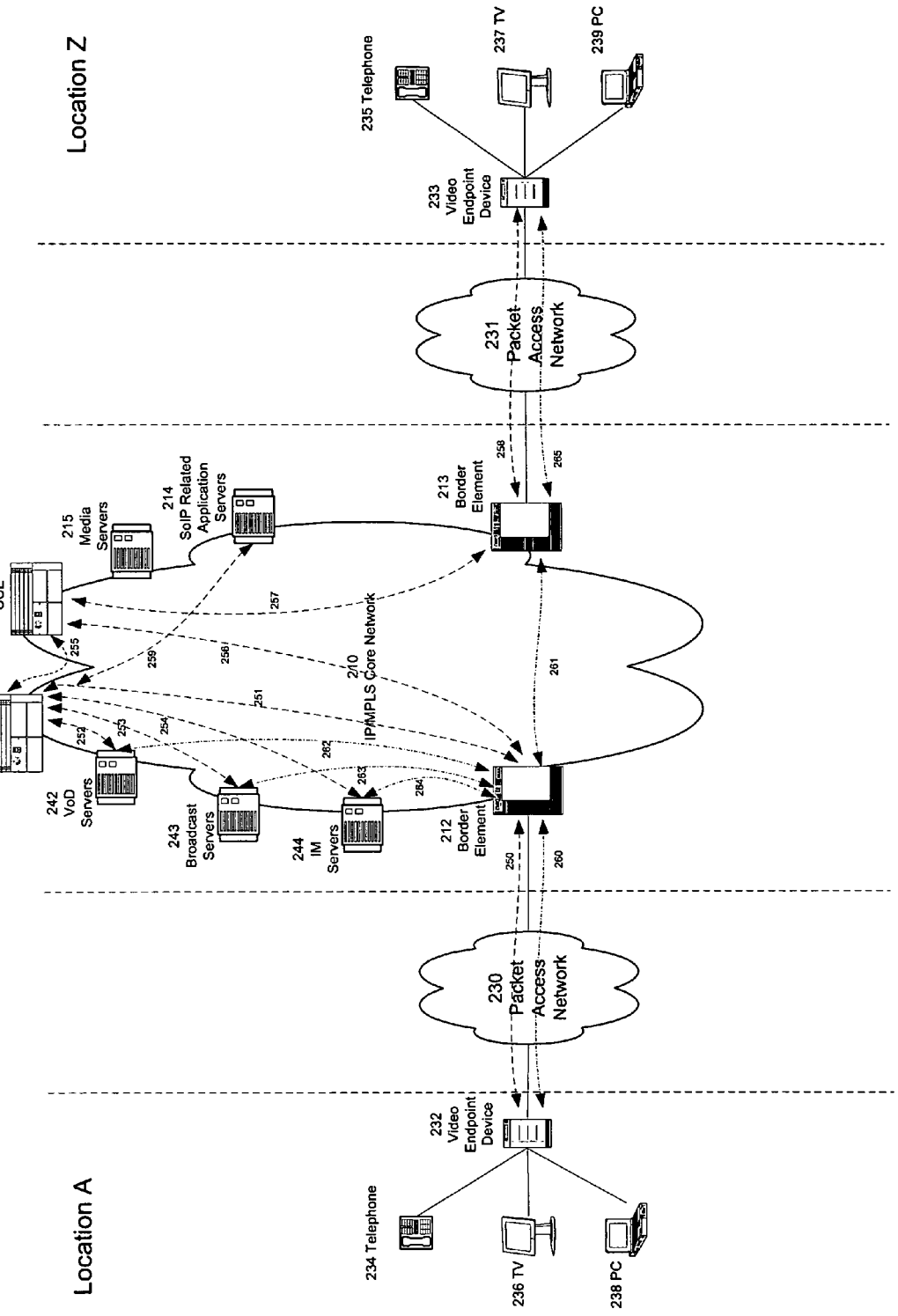
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates an example network 200, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g., a VoIP session endpoint, an instant messaging endpoint, or a video session endpoint. In one embodiment, a video endpoint device is a standalone device that can be connected to home electronic appliances such as, but is not limited to, telephones 234 and 235, TVs 236 and 237, or Personal Computer (PCs) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Sever is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data providing more convenience for end customers and creating new service opportunities. Due to the multi-service nature of these new services, networks need to provide additional functionalities to end customers to support integrated control of these different types of services. For instance, if a video session is active while an incoming call is received, then the network must provide the subscriber with the appropriate service logic to handle the incoming call while the video session is on-going.

To address this need, the present invention enables a SoIP network supporting video services by creating a display frame, such as a picture-in-picture display frame, on an active video display device, such as a television (TV), when an incoming call is received. The calling party identification and the service logic to manipulate the call are displayed within the display frame. The network can provide service logic functions such as, but are not limited to, answering the call, sending to call to voice mailbox, providing a busy tone to the calling party, and forwarding the call to another SoIP endpoint. The on-going video session can be placed on hold, moved to the background within the display, or continued as is while the incoming call is active.

Figure 3:
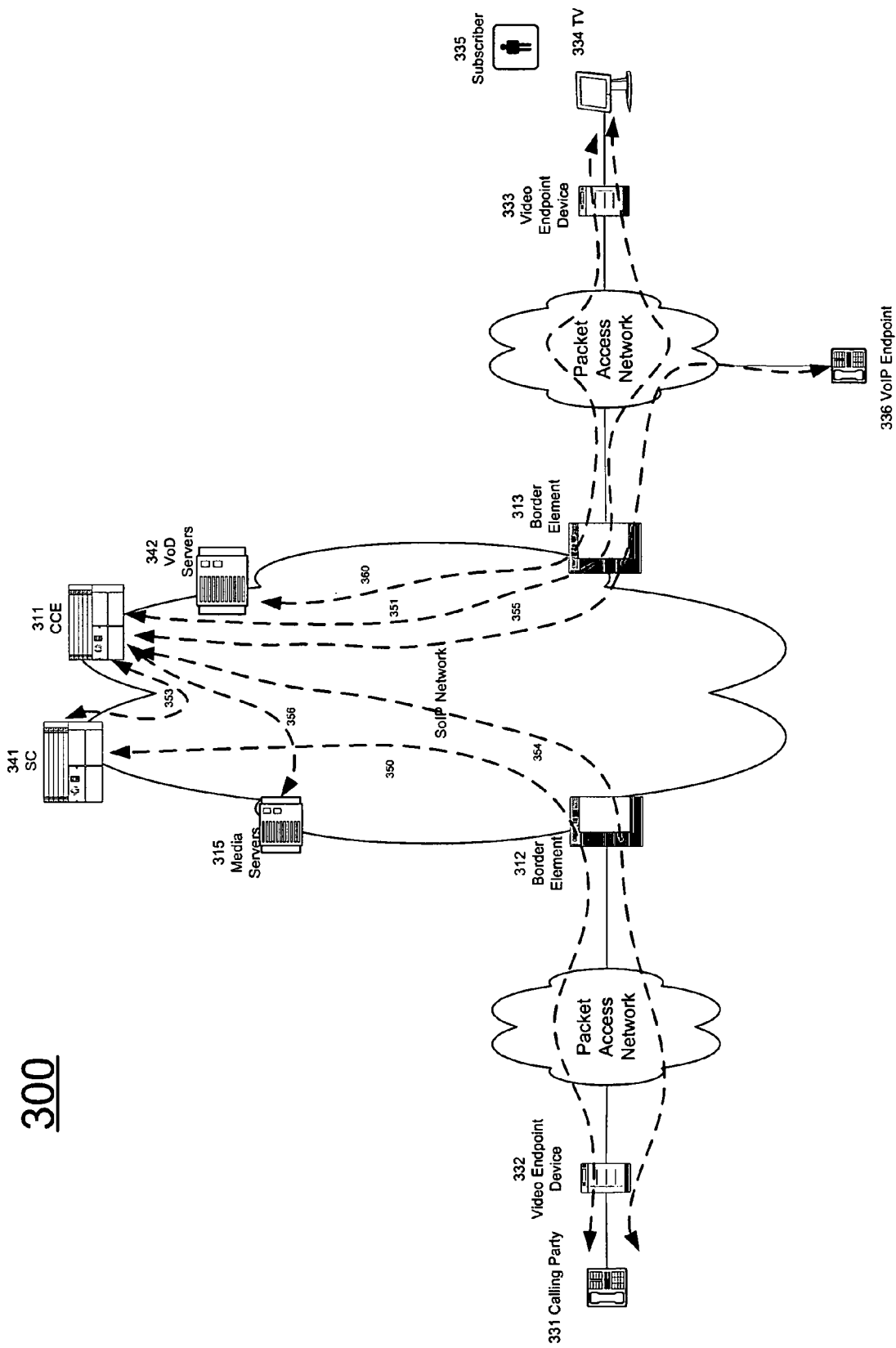
FIG. 3 illustrates an example of activating an incoming call voice session on a video display device in a packet network, e.g., a SoIP network, of the present invention.

FIG. 3 illustrates an exemplary communication architecture 300 for activating an incoming call voice session on a video display device in a packet network, e.g., a SoIP network, of the present invention. In FIG. 3, subscriber 335 is currently watching a video using TV 334. The streaming video flow originates at VoD Server 342 and is sent via BE 313 to video endpoint 333 using video flow 360. Video endpoint 333 terminates the video flow and displays the video on TV 334. While the video session is on-going, calling party 331 places a call to subscriber 335. A call setup signaling message is sent by video endpoint 332 to SC 341 via BE 312 using signaling flow 350. Since the call setup message is for a VoIP call, SC 341 forwards the call setup message to CCE 311 using signaling flow 353 for further processing. Upon receiving the call setup message, CCE 311 sends the call setup message to video endpoint 333 via BE 313 using signaling flow 351. Upon receiving the call setup message, a separate display frame, such as a picture-in-picture display frame, with the incoming call information such as the calling party identification is displayed on TV 334. In addition, service logic associated with the incoming call is also displayed on TV 334 in the display frame as well. Service logic options displayed to subscriber 335 for selection include, but are not limited to, answering the call, sending the call to voice mailbox, providing a busy tone to the calling party, and forwarding the call to another SoIP endpoint. If subscriber 335 decides to answer the incoming call, the on-going video session can be placed on hold, moved to the background within the display, or continued as is while the answered call is active. The incoming call can be accepted by subscriber 335 by signaling CCE 311 using signaling flow 351. Upon receiving the call accept signaling, CCE 311 completes the call setup process by signaling the calling party 331 using signaling flow 354. If subscriber 335 decides to send the call to a voice mailbox in the network, a signaling message can be sent to CCE 311 using signaling flow 351. Upon receiving the signaling message, CCE 311 forwards the call to MS 315 using signaling flow 356 that handles voice mail functions. If subscriber decides to reject the call, a busy tone can be signaled to the calling party using signaling flows 351 and 354. If subscriber 335 decides to forward the call to another SoIP endpoint, such as VoIP endpoint 336, the call forwarding can be signaled back to CCE 311 using signaling flow 351. Upon receiving the call forwarding request with the forwarding endpoint phone number of VoIP endpoint 336 specified by the subscriber, CCE 311 forwards the call setup message to VoIP endpoint 336 using signaling flow 355.

Figure 4:
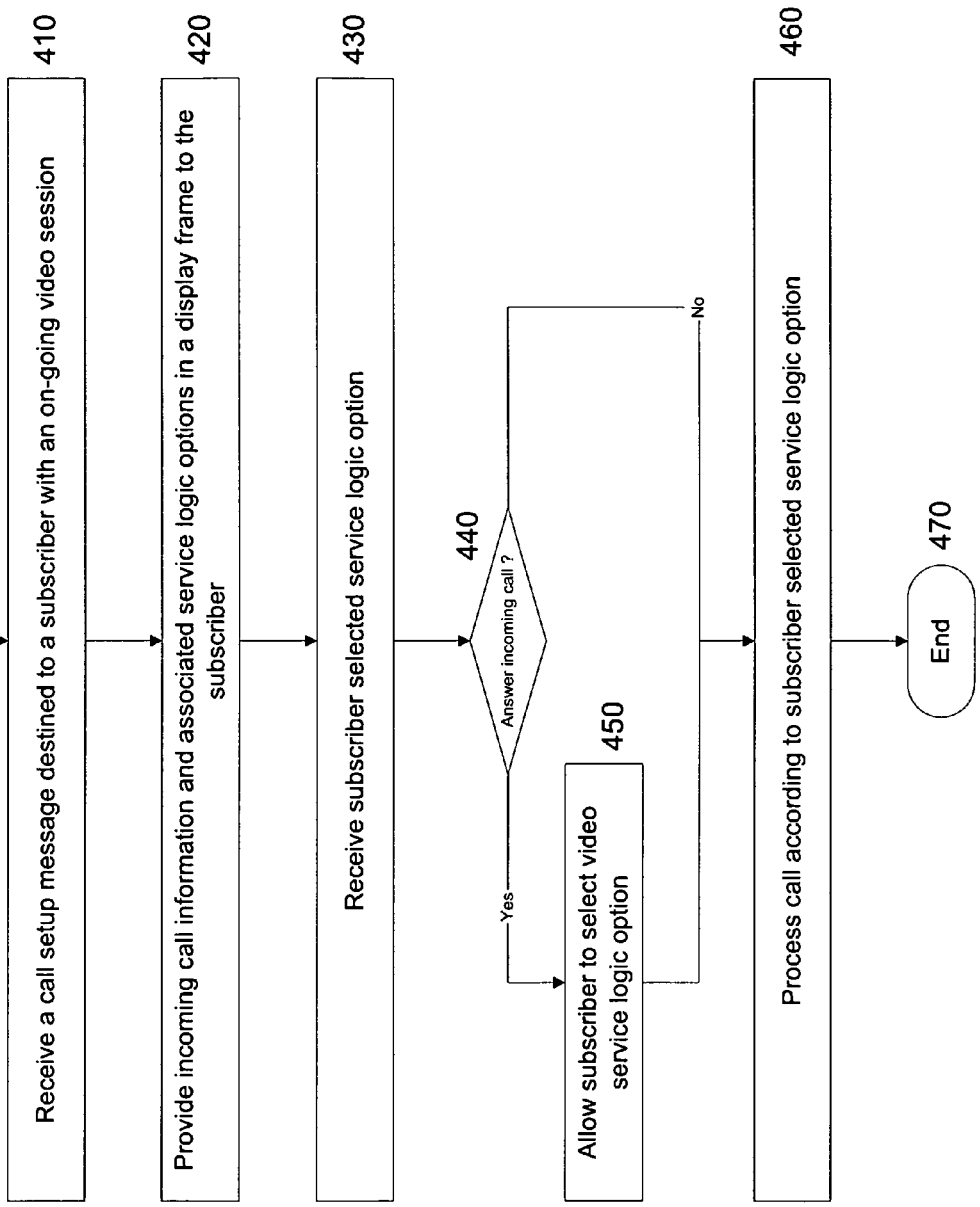
FIG. 4 illustrates a flowchart of a method for activating an incoming call voice session on a video display device in a packet network, e.g., a SoIP network, of the present invention.

FIG. 4 illustrates a flowchart of a method 400 for activating an incoming call voice session on a video display device in a packet network, e.g., a SoIP network, of the present invention. Method 400 starts in step 405 and proceeds to step 410.

In step 410, the method receives a call setup message while a subscriber is engaged in an on-going video session. The call setup message is received by the subscriber's video endpoint device.

In step 420, the method provides the incoming call information such as the calling party identification and displays it in a display frame within a video display currently used by the subscriber. In addition, service logics associated with the incoming call are also displayed in the same display frame. Service logic options displayed to the subscriber for selection include, but are not limited to, answering the call, sending the call to voice mailbox, providing a busy tone to the calling party, and forwarding the call to another SoIP endpoint.

In step 430, the method receives the subscriber selected service logic option associated with the call. The service logic option selection is entered by the subscriber via a keyboard or a remote control device.

In step 440, the method checks if the subscriber chooses to answer the call. If the subscriber chooses to answer the call, the method proceeds to step 450; otherwise, the method proceeds to step 460.

In step 450, the method provides video related service logic options for the subscriber to select. Video related service logic options include, but are not limited to, placing the current video session on hold, moving the current video session to the background within the display frame, or continuing the current video session as is while the answered call is active.

In step 460, the method processes the call according to the subscriber selected service logic option. For the answered call service logic option, the call setup procedures will be completed and a media path established for the call. For the voice mailbox service logic option, the call will be forwarded to the subscriber's voice mailbox. For the busy tone service logic option, a busy tone will be signaled to the calling party. For the call forwarding service logic option, the call will be forwarded to another SoIP endpoint specified by the subscriber. The method ends in step 470.

Figure 5:
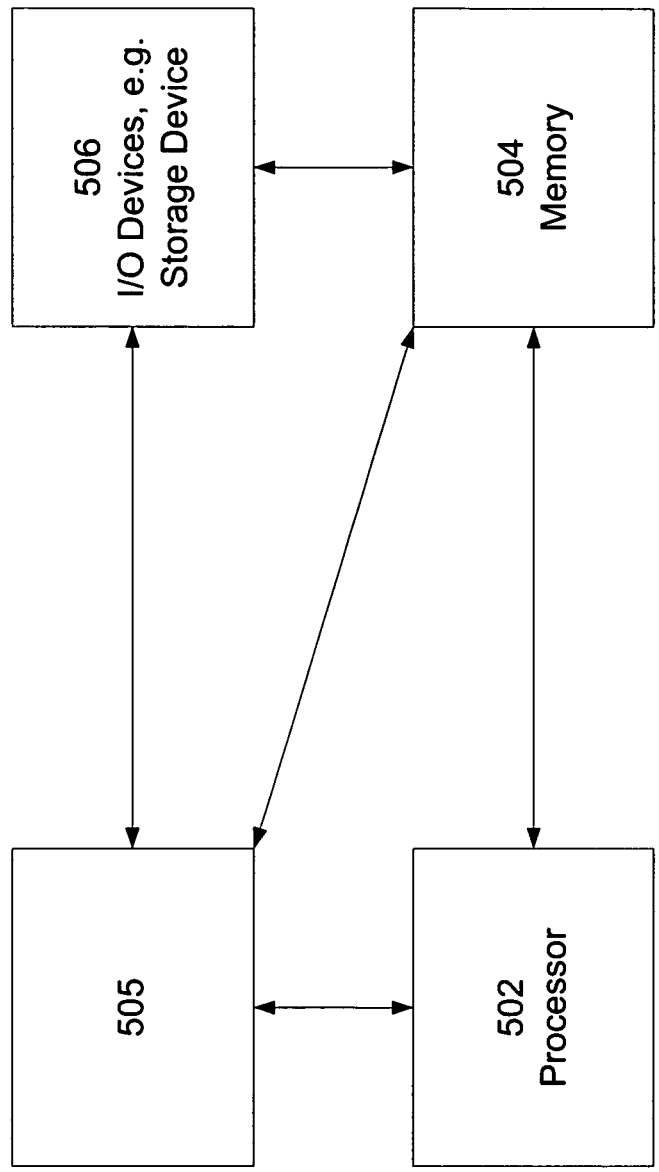
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for activating an incoming call voice session on a video display device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for activating an incoming call voice session on a video display device can be loaded into memory 504 and executed by processor 502 to implement the functions as discussed above. As such, the present process 505 for activating an incoming call voice session on a video display device (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing an incoming call-setup signaling message in a communication network, comprising:
   receiving, by a call control element deployed within a core infrastructure of the communication network of a service provider, the incoming call setup signaling message for an incoming call for a voice only session destined to a subscriber currently engaging in an ongoing video session, wherein the service provider provides the ongoing video session and the voice only session as a service to the subscriber, wherein the ongoing video session is established via a session controller deployed within the core infrastructure of the communication network of the service provider, wherein the incoming call setup signaling message is received via the session controller;
   sending, by the call control element, identification information of a calling party to be displayed in an independent display frame on a video display device currently used by the subscriber;
   enabling, by the call control element, the subscriber to place the video session on hold;
   sending, by the call control element a plurality of service logic options to be displayed in the independent display frame, wherein the plurality of service logic options comprises an option to answer the incoming call, an option to send the incoming call to a voice mailbox, an option to provide a busy tone to the calling party, and an option to forward the incoming call to a service over internet protocol endpoint specified by the subscriber; and
   processing, by the call control element, the incoming call setup signaling message in accordance with one of the plurality of service logic options selected by the subscriber, wherein the call control element functions as a session initiation protocol back-to-back user agent and is a signaling endpoint for all call legs between the call control element and a border element, wherein the border element is for allowing the subscriber to interface with the core infrastructure of the communication network, wherein the border element is responsible for security and call admission to the communication network, wherein the border element is capable of performing a signaling protocol translation between SS7 and session initiation protocol.

2. The method of claim 1, wherein the communication network is a service over internet protocol network.

3. The method of claim 1, further comprising:
   enabling the subscriber to move a display frame of the video session into a background.

4. The method of claim 1, further comprising:
   enabling the subscriber to continue the video session if the incoming call is answered by the subscriber.

5. A non-transitory computer-readable medium storing a plurality of instructions which, when executed by a processor of a call control element, cause the processor to perform operations for processing an incoming call setup signaling message in a communication network, the operations comprising:
   receiving the incoming call setup signaling message for an incoming call for a voice only session destined to a subscriber currently engaging in an ongoing video session, wherein the call control element is deployed within a core infrastructure of the communication network of a service provider, wherein the service provider provides the ongoing video session and the voice only session as a service to the subscriber, wherein the ongoing video session is established via a session controller deployed within the core infrastructure of the communication network of the service provider, wherein the incoming call setup signaling message is received via the session controller;
   sending identification information of a calling party to be displayed in an independent display frame on a video display device currently used by the subscriber;
   enabling the subscriber to place the video session on hold;
   sending a plurality of service logic options to be displayed in the independent display frame, wherein the plurality of service logic options comprises an option to answer the incoming call, an option to send the incoming call to a voice mailbox, an option to provide a busy tone to the calling party, and an option to forward the incoming call to a service over internet protocol endpoint specified by the subscriber; and
   processing the incoming call setup signaling message in accordance with one of the plurality of service logic options selected by the subscriber, wherein the call control element functions as a session initiation protocol back-to-back user agent and is a signaling endpoint for all call legs between the call control element and a border element, wherein the border element is for allowing the subscriber to interface with the core infrastructure of the communication network, wherein the border element is responsible for security and call admission to the communication network, wherein the border element is capable of performing a signaling protocol translation between SS7 and session initiation protocol.

6. The non-transitory computer-readable medium of claim 5, wherein the communication network is a service over internet protocol network.

7. The non-transitory computer-readable medium of claim 5, further comprising:
   enabling the subscriber to move a display frame of the video session into a background.

8. The non-transitory computer-readable medium of claim 5, further comprising:
   enabling the subscriber to continue the video session if the incoming call is answered by the subscriber.

9. A call control element for processing an incoming call setup signaling message in a communication network of a service provider, comprising:
- a hardware processor; and
- a computer readable medium storing instructions that, when executed by the hardware processor, cause the hardware processor to perform operations, the operations comprising:
  - receiving the incoming call setup signaling message for an incoming call for a voice only session destined to a subscriber currently engaging in an ongoing video session, wherein the call control element is deployed within a core infrastructure of the communication network of the service provider, wherein the service provider provides the ongoing video session and the voice only session as a service to the subscriber, wherein the ongoing video session is established via a session controller deployed within the core infrastructure of the communication network of the service provider, wherein the incoming call setup signaling message is received via the session controller;
  - sending identification information of a calling party to be displayed in an independent display frame on a video display device currently used by the subscriber;
  - enabling the subscriber to place the video session on hold;
  - sending a plurality of service logic options to be displayed in the independent display frame, wherein the plurality of service logic options comprises an option to answer the incoming call, an option to send the incoming call to a voice mailbox, an option to provide a busy tone to the calling party, and an option to forward the incoming call to a service over internet protocol endpoint specified by the subscriber; and
  - processing the incoming call setup signaling message in accordance with one of the plurality of service logic options selected by the subscriber, wherein the call control element functions as a session initiation protocol back-to-back user agent and is a signaling endpoint for all call legs between the call control element and a border element, wherein the border element is for allowing the subscriber to interface with the core infrastructure of the communication network, wherein the border element is responsible for security and call admission to the communication network, wherein the border element is capable of performing a signaling protocol translation between SS7 and session initiation protocol.

10. The call control element of claim 9, wherein the communication network is a service over internet protocol network.

* * * * *